United States Patent
Glaser et al.

(10) Patent No.: US 12,394,948 B2
(45) Date of Patent: Aug. 19, 2025

(54) HIGH-CURRENT CONTACT DEVICE AND CONNECTION DEVICE FOR TRANSMITTING ELECTRICAL ENERGY IN A MOTOR VEHICLE

(71) Applicant: TE Connectivity Germany GmbH, Bensheim (DE)

(72) Inventors: Stefan Ernst Glaser, Bensheim (DE); Walter Saenger, Bensheim (DE); Lukas Schroth, Bensheim (DE)

(73) Assignee: TE Connectivity Germany GmbH, Bensheim (DE)

( * ) Notice: Subject to any disclaimer, the term of this patent is extended or adjusted under 35 U.S.C. 154(b) by 697 days.

(21) Appl. No.: 17/360,189

(22) Filed: Jun. 28, 2021

(65) Prior Publication Data
US 2021/0408738 A1  Dec. 30, 2021

(30) Foreign Application Priority Data
Jun. 26, 2020 (DE) .......................... 102020116904.3

(51) Int. Cl.
| | |
|---|---|
| *H01R 13/66* | (2006.01) |
| *G01K 1/08* | (2021.01) |
| *G01K 1/14* | (2021.01) |
| *H01R 13/502* | (2006.01) |

(52) U.S. Cl.
CPC ........... *H01R 13/6683* (2013.01); *G01K 1/08* (2013.01); *G01K 1/14* (2013.01); *H01R 13/502* (2013.01)

(58) Field of Classification Search
None
See application file for complete search history.

(56) References Cited

U.S. PATENT DOCUMENTS

| | | | |
|---|---|---|---|
| 9,207,685 B2 * | 12/2015 | Chen | .............. H01R 25/003 |
| 9,373,918 B2 | 6/2016 | Kawai et al. | |
| 10,256,579 B2 | 4/2019 | Fuehrer et al. | |
| 10,530,101 B2 | 1/2020 | Rose et al. | |

(Continued)

FOREIGN PATENT DOCUMENTS

| | | |
|---|---|---|
| CN | 106575842 A | 4/2017 |
| CN | 109982890 A | 7/2019 |

(Continued)

OTHER PUBLICATIONS

Wikipedia/Thermistor, Retrieved from "https://en.wikipedia.org/w/index.php?title=Thermistor&oldid=1233389087", Jun. 2021.*

(Continued)

*Primary Examiner* — Felix O Figueroa
(74) *Attorney, Agent, or Firm* — Barley Snyder

(57) ABSTRACT

A high-current contact device includes a contact element insertable along a plug-in axis at least partially into a further contact element of a further high-current contact device, a contact housing having a contact receiver receiving the contact element, and a temperature measuring device. The contact housing has a sensor receiver that is inclined with respect to the plug-in axis and leads into the contact receiver. The temperature measuring device is arranged at least partially in the sensor receiver. The temperature measuring device bears against an outer circumferential side of the contact element and measures a temperature of the contact element.

17 Claims, 3 Drawing Sheets

(56) References Cited

U.S. PATENT DOCUMENTS

| | | | |
|---|---|---|---|
| 10,644,462 B2 * | 5/2020 | Shimizu | H01R 4/72 |
| 10,644,463 B2 * | 5/2020 | Tanizaki | H01R 13/6683 |
| 10,850,631 B2 * | 12/2020 | Myer | H02J 7/0045 |
| 11,462,864 B2 * | 10/2022 | Saito | H01R 13/447 |
| 11,539,173 B2 * | 12/2022 | Saito | H01R 13/5216 |
| 11,682,867 B2 | 6/2023 | Stross et al. | |
| 2016/0126681 A1 | 5/2016 | Kawai et al. | |
| 2019/0334293 A1 | 10/2019 | Iwami et al. | |

FOREIGN PATENT DOCUMENTS

| CN | 110401075 A | 11/2019 |
|---|---|---|
| DE | 102015106251 A1 | 10/2016 |
| DE | 102016107401 A1 | 8/2017 |
| EP | 3560750 A1 | 10/2019 |
| EP | 3644455 A1 | 4/2020 |
| JP | H05036448 A | 2/1993 |
| JP | 2000294407 A | 10/2000 |
| JP | 2010054491 A | 3/2010 |
| JP | 2015008099 A | 1/2015 |
| JP | 2016207392 A | 12/2016 |
| JP | 2019192482 A | 10/2019 |

OTHER PUBLICATIONS

German Office Action, dated May 22, 2021, 7 pages.
Abstract of DE 10 2016 107 401, dated Aug. 31, 2017, 1 page.
German Office Action, dated Jun. 8, 2021, 5 pages.
Japanese Office Action with English translation, Application No. 2021-103705, Dated: Aug. 2, 2022, 18 pages.
Chinese Office Action dated Dec. 21, 2023 with English translation, corresponding to Application No. 202110696068.8, 16 pages.

* cited by examiner

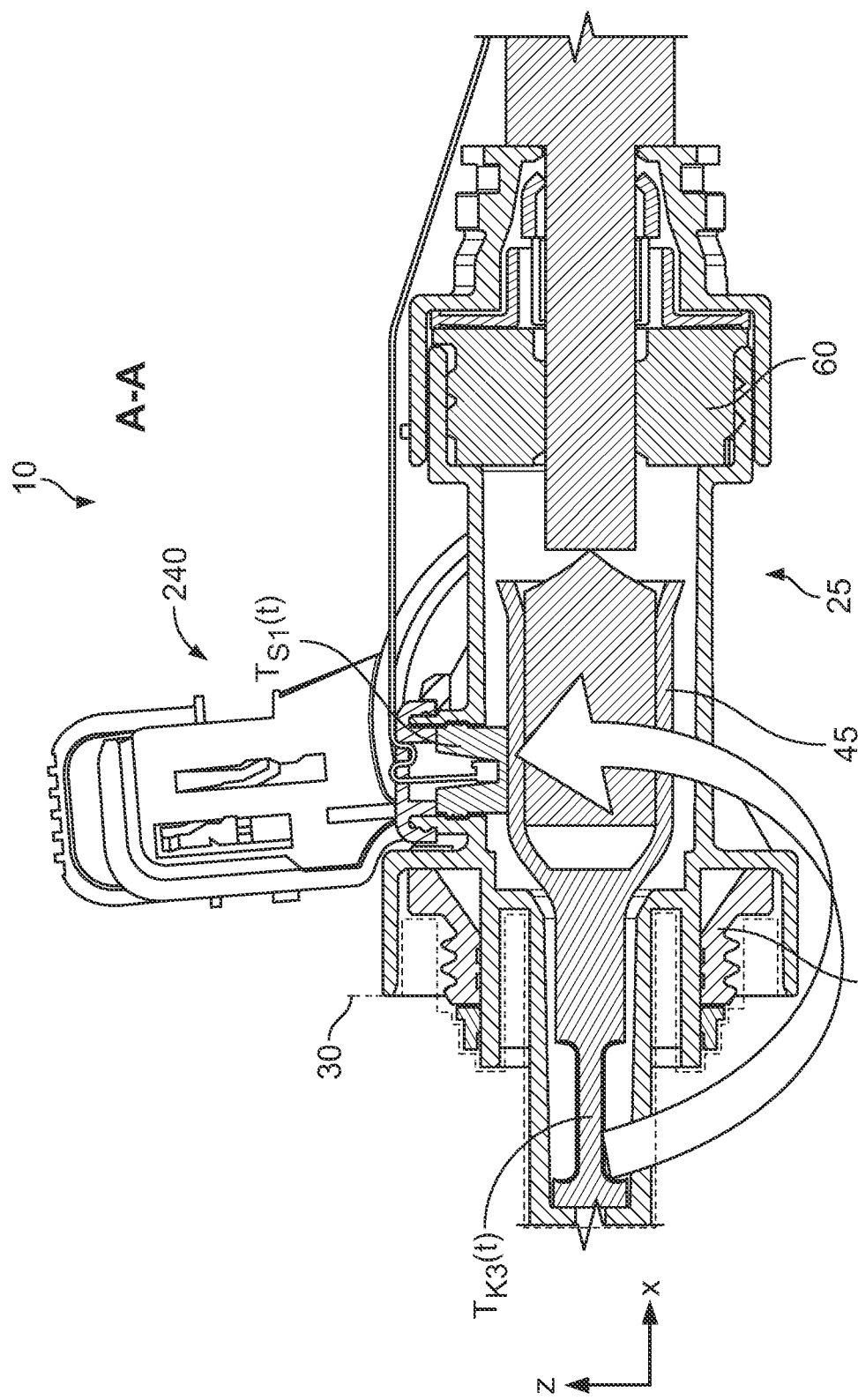

HIGH-CURRENT CONTACT DEVICE AND CONNECTION DEVICE FOR TRANSMITTING ELECTRICAL ENERGY IN A MOTOR VEHICLE

CROSS-REFERENCE TO RELATED APPLICATIONS

This application claims the benefit of the filing date under 35 U.S.C. § 119(a)-(d) of German Patent Application No. 102020116904.3, filed on Jun. 26, 2020.

FIELD OF THE INVENTION

The present invention relates to a contact device and, more particularly, to a high-current contact device.

BACKGROUND

A plug-in device having temperature sensing is known from DE 10 2016 107 401 A1.

SUMMARY

A high-current contact device includes a contact element insertable along a plug-in axis at least partially into a further contact element of a further high-current contact device, a contact housing having a contact receiver receiving the contact element, and a temperature measuring device. The contact housing has a sensor receiver that is inclined with respect to the plug-in axis and leads into the contact receiver. The temperature measuring device is arranged at least partially in the sensor receiver. The temperature measuring device bears against an outer circumferential side of the contact element and measures a temperature of the contact element.

BRIEF DESCRIPTION OF THE DRAWINGS

The invention will now be described by way of example with reference to the accompanying Figures, of which:

FIG. 4 is a sectional side view of the system, taken along plane A-A in FIG. 1.

DETAILED DESCRIPTION OF THE EMBODIMENTS

In the following figures, reference is made to a coordinate system. The coordinate system is exemplarily realized as a right-hand system and has an x-axis (longitudinal direction), a y-axis (transverse direction) and a z-axis (vertical direction).

Figure 1:
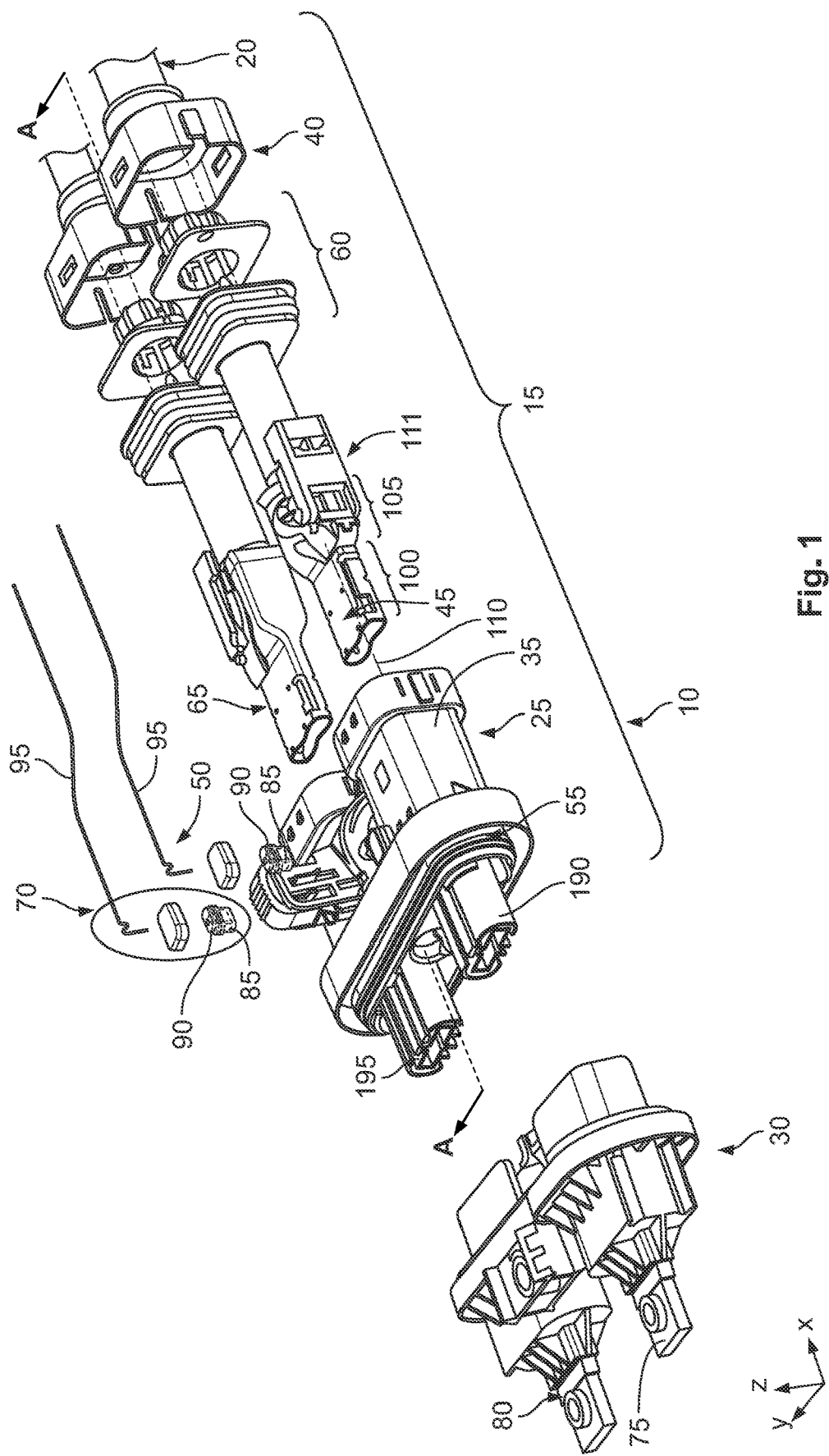
FIG. 1 is an exploded perspective view of a system having a connection device.

FIG. 1 shows an exploded representation of a system 10 comprising a connection device 15. The connection device 15 has at least one high-current cable 20 and a first high-current contact device 25. The system 10 additionally has a second high-current contact device 30.

In the embodiment shown in FIG. 1, the first high-current contact device 25 and the second high-current contact device 30 are realized as multipole contact devices. It would of course also be conceivable, contrary to the multipole design shown in FIG. 1, in particular to the two-pole design shown in FIG. 1, for the first high-current contact device 25 and the second high-current contact device 30 to be single-pole. For reasons of simplification, the first high-current contact device 25 and the second high-current contact device 30 are described below in relation to a two-pole design, the detailed description being based on one of the poles of the high-current contact device 25, 30.

In an embodiment, the system 10 serves to transmit drive energy in a motor vehicle, for the purpose of driving a drive motor of the motor vehicle. It is also possible for the system 10 to transmit a charging current for charging an electrical energy storage device of the motor vehicle. In the embodiment, the system 10 is designed to transmit an electrical current of between 10 and 1000 amperes, between 200 and 600 amperes, or between 400 and 500 amperes, for at least 20 seconds, one minute, or at least 5 minutes. An upper time limit of the drive current, or charging current, to be transmitted is substantially determined by the capacity of the electrical energy storage device. The electrical power transmitted via the high-current contact device 25, 30 may be 30 kW to 400 kW. A voltage applied to the high-current contact device 25, 30 may be between 48 V and 500 V, for example, and thus differs significantly from the usual 12-volt or 24-volt electrical power system of the motor vehicle.

The first high-current contact device 25 has a first contact housing 35, a second contact housing 40, at least one first contact element 45 and at least one first temperature measuring device 50. In addition, as an example in FIG. 1, the first high-current contact device 25 has a first sealing device 55, a second sealing device 60, a second contact element 65 and a second temperature measuring device 70.

In FIG. 1, exemplarily, the first contact element 45 and the second contact element 65 are mirror-symmetrical in relation to a plane of symmetry that is arranged centrally between the first contact element 45 and the second contact element 65. The first and the second contact element 45, 65 each comprise an electrically and thermally conductive material. The material has a thermal conductivity of greater than and inclusive of 1 W/(m·K) to 2 W/(m·K).

The first temperature measuring device 50 is assigned to the first contact element 45, and the second temperature measuring device 70 is assigned to the second contact element 65. The first temperature measuring device 50 in this case is designed to measure a first temperature $T_{S1}(t)$ of the first contact element 45. The second temperature measuring device 70, which in the embodiment is identical to the first temperature measuring device 50, is designed to measure a second temperature $T_{S2}(t)$ of the second contact element 65.

The second high-current contact device 30 is designed so as to correspond to the first high-current contact device 25. In the embodiment shown in FIG. 1, the second high-current contact device 30 exemplarily has a third contact element 75 and a fourth contact element 80, the third contact element 75 being designed, when having been fitted together with the first high-current contact device 25, to realize an electrical contact with the first contact element 45. Similarly, the fourth contact element 80 is designed, when the first high-current contact device 25 has been fitted on the second high-current contact device 30, to form an electrical contact with the second contact element 65.

In the embodiment shown in FIG. 1, a polarity of the high-current contact device 25, 30 may be selected such that, for example, the first contact element 45 and the third contact element 75 are electrically connected to a first pole of the electrical energy storage device, for example a positive pole. The second contact element 65 and the fourth contact element 80 may be electrically connected, for example, to a second pole, for example a negative pole, of the electrical energy storage device. It would also be conceivable for the contact elements 45, 65, 75, 80 to be connected in parallel. Thus, for example, the contact elements 45, 65, 75, 80 may be connected only to the positive pole of the electrical energy storage device or only to the negative pole of the electrical energy storage device, such that the system 10 can transmit a particularly high electrical current. This design is advantageous in particular if the drive motor has a particularly high power consumption. Consequently, the system 10 is particularly suitable for use in commercial vehicles.

The first contact element 45 is realized, exemplarily, as a socket contact in the embodiment shown in FIG. 1. The first contact element 45 has a plug-in region 100 and a connection region 105 that is mechanically and electrically connected to the plug-in region 100. The plug-in region 100 extends along a plug-in axis 110, which extends in the x-direction. In the embodiment, the first contact element 45 is rectilinear, such that the connection region 105 also extends along the plug-in axis 110. The first contact element 45 could also be realized as an angled contact element, i.e. the connection region 105 is inclined, for example perpendicularly, with respect to the plug-in region 100. In addition, there may be a contact lock 111 arranged on the first contact element 45.

As shown in FIG. 1, the first sealing device 55 is arranged on a side of the first contact housing 35 that faces toward the second high-current contact device 30. The second sealing device 60 and the second contact housing 40 are arranged on a side of the first contact housing 35 that faces away from the second high-current contact device 30 with respect to the plug-in axis 110. In the assembled state, the second contact housing 40 is fastened to the first contact housing 35 and closes the first high-current contact device 25 at the rear on a side that faces away from the second high-current contact device 30. The high-current cable 20 runs on the side that faces away from the second high-current contact device 30 and is led, for example, to the drive motor or to a control unit for controlling the drive motor.

The first contact housing 35 has a first contact receiver 190 for the first contact element 45, and has a second contact receiver 195 for the second contact element 65. The first contact element 45 is arranged in the first contact receiver 190, and the second contact element 65 is arranged in the second contact receiver 195. The first contact receiver 190 and the second contact receiver 195 are arranged offset from each other in the y-direction. The first and second contact receivers 190, 195 in this case may be mirror-symmetrical. The first contact receiver 190 extends substantially in its direction of main extent along the x-axis.

Figures 2, 3:
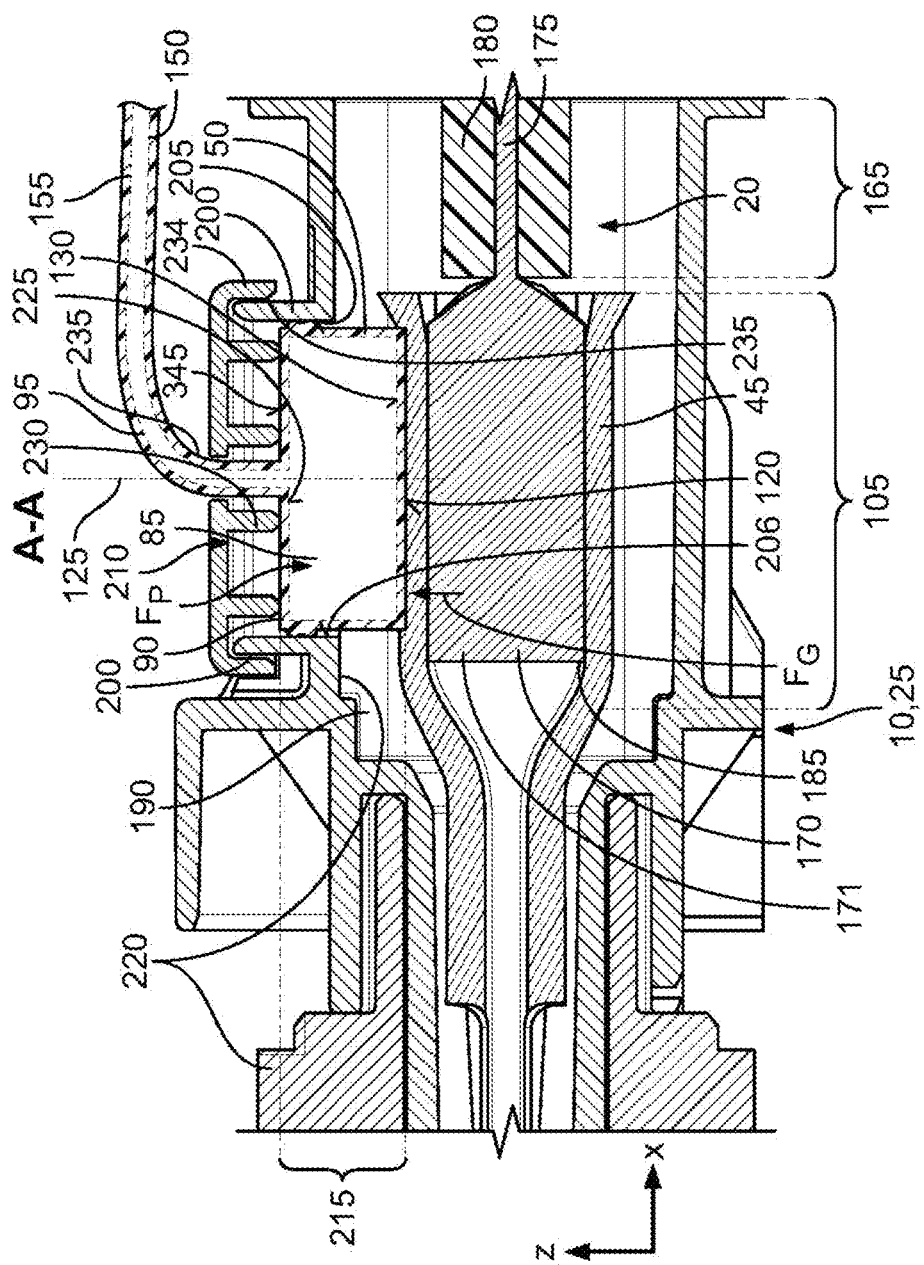
FIG. 2 is a perspective view of a temperature measuring device of a first high-current contact device.
FIG. 3 is a sectional side view of the first high-current contact device, taken along plane A-A in FIG. 1.

FIG. 2 shows a perspective partial representation of the temperature measuring device 50, 70 of the first high-current contact device 25 shown in FIG. 1. The temperature measuring devices 50, 70 each have a temperature sensor 85, a sensor casing 90 and a connection cable 95. The temperature sensor 85 is shown schematically in FIG. 2 by a dashed line. The first temperature measuring device 50 is described below. The first temperature measuring device 50 and the second temperature measuring device 70 are, exemplarily, identical to each other. What is explained below for the first temperature measuring device 50 also applies—unless otherwise stated—to the second temperature measuring device 70.

The temperature sensor 85 may be realized, for example, as a negative temperature coefficient (NTC) element. Another design of the temperature sensor 85 is also conceivable. The temperature sensor 85 is embedded in the sensor casing 90, as shown in FIG. 2. Embedding of the temperature sensor 85 in the sensor casing 90 is understood in this case to mean that the temperature sensor 85 is completely enclosed circumferentially by the sensor casing 90 and that none of the side surfaces of the temperature sensor 85 are exposed circumferentially, even only partially. In addition, the sensor casing 90 may be connected to the temperature sensor 85 in a materially bonded manner, such that an unintentional detachment of the sensor casing 90 and/or formation of a gap between the sensor casing 90 and the temperature sensor 85 is avoided. In this way, seepage of moisture between the sensor casing 90 and the temperature sensor 85 can be prevented. In the measuring of the first temperature $T_{S1}(t)$ by the temperature sensor 85, therefore, it is thus possible to avoid leakage currents and a resulting falsification of a measurement result of the temperature sensor 85.

The sensor casing 90 has a first outer circumferential side 115. FIG. 2 shows, exemplarily, the sensor casing 90 having a bearing contact surface 120 on the underside. Exemplarily, the bearing contact surface 120 is of a flat design. The bearing contact surface 120 extends, exemplarily, in an xy-plane. The bearing contact surface 120 may also be curved.

On the first outer circumferential side 115, the sensor casing 90 has, for example, a sealing contour 135. The sealing contour 135 may have one or more sealing lips 140. The sealing contour 135 is realized around the circumference, in an embodiment around the entire circumference, on the first outer circumferential side 115. Instead of the sealing lip 140, the sealing contour 135 may also be of a different design. In FIG. 2, for example, the sealing lips 140 are arranged offset from each other in the z-direction.

On the upper side in FIG. 2, on a side that faces away from the bearing contact surface 120, the sensor casing 90 has a pressing surface 145. The pressing surface 145 is parallel to the bearing contact surface 120. The pressing surface 145 in this case may be flat and extend in an xy-plane. The connection cable 95 is led out of the pressing surface 145, exemplarily, in a central position with respect to the pressing surface 145.

Opposite to the bearing contact surface 120 in the z-direction, the connection cable 95 of the temperature measuring device 50, 70 is led out of the press surface 145 in a straight line along an axis 125 shown in FIG. 2. When the temperature measuring device 50, 70 has been assembled, the axis 125 is aligned perpendicularly in relation to the plug-in axis 110. For example, the axis 125 runs in a plane perpendicular to the plug-in axis 110. In this case, as shown in FIG. 2, the axis 125 may run in the z-direction. The connection cable 95 may be bent at a distance from the sensor casing 90 in order to guide the connection cable 95 to an evaluation device of the motor vehicle.

The connection cable 95 has a first cable sheathing 150 shown in FIG. 2. The first cable sheathing 150 is made of an electrically insulating material. The first cable sheathing 150 may comprise a first matrix material, the first matrix material comprising, for example, silicone, polyurethane, polyethylene. Furthermore, the connection cable 95 comprises at least one sensor line 155, which is electrically conductive and provides an electrical connection between the temperature sensor 85 and the evaluation device. The sensor line 155 is completely enclosed circumferentially by the first cable sheathing 150 in an embodiment.

The connection cable 95 is led to the temperature sensor 85. In an embodiment, a first sub-portion 160 of the connection cable 95 is embedded in the sensor casing 90. The sensor casing 90 is connected in a materially bonded manner to the first cable sheathing 150 in the first sub-portion 160. The material-bonded connection prevents the formation of a seepage gap. This prevents the ingress of moisture and/or water in the region of the connection cable 95 and the sensor casing 90.

FIG. 3 shows a detail of a sectional view through the first high-current contact device 25 shown in FIG. 1, along a sectional plane A-A shown in FIG. 1. When the first temperature measuring device 50 is in the assembled state, the bearing contact surface 120 bears flatly against a second outer circumferential side 130 of the first contact element 45 in the connection region 105 of the first contact element 45. In an embodiment, the bearing contact surface 120 is realized so as to correspond to the second outer circumferential side 130 of the first contact element 45.

The high-current cable 20, as shown in FIG. 3, has a second sub-portion 165 and a third sub-portion 170. The third sub-portion 170 adjoins an end 171 of the high-current cable 20. The second sub-portion 165 is spaced from the end 171 of the high-current cable 20. The high-current cable 20 has an electrical conductor 175, the electrical conductor 175 having a cross-sectional area of at least 15 square millimeters, at least 25 square millimeters, or at least 50 square millimeters in various embodiments. The electrical conductor 175 may be of a fine or very fine stranded construction.

The high-current cable 20 also has a second cable sheathing 180 shown in FIG. 3, the second cable sheathing 180 enclosing and sheathing the electrical conductor 175 on the circumferential side in the second sub-portion 165. The second cable sheathing 180 in this case electrically insulates the electrical conductor 175.

In the third sub-portion 170, the second cable sheathing 180 is spaced apart from the electrical conductor 175, and the electrical conductor 175 is arranged in a connection receiver 185 of the connection region 105. In an embodiment, the connection region 105 is crimped in the connection receiver 185. In addition or alternatively, further materially bonded and/or positive and/or non-positive connections are possible for electrically and mechanically connecting the third sub-portion 170 to the connection receiver 185.

The sensor casing 90 thermally connects the temperature sensor 85 to the second outer circumferential side 130 of the connection region 105. For this purpose, the sensor casing 90 in an embodiment has at least one of the following second matrix materials: silicone, polyurethane, polyethylene. In an embodiment, the first matrix material is identical to the second matrix material; in the manufacture of the first temperature measuring device 50 by an injection-molding process, the temperature sensor 85, which is already connected to the connection cable 95, and the first sub-portion 160 can be encapsulated with the second matrix material, which is still liquid or viscous and is to be cured, and the second matrix material, upon curing, realizes the materially bonded connection to the first matrix material of the first cable sheathing 150. A particularly good bond is thereby ensured between the first cable sheathing 150 and the sensor casing 90.

In addition, there may be at least one particulate filler, for example aluminum and/or silver and/or copper, embedded in the second matrix material of the sensor casing 90. Due to the filler, a thermal conductivity of the sensor casing 90 is particularly high. As a result, the sensor casing 90 has a thermal conductivity of from 100 to 300 W/(m·K).

On the side of the first contact housing 35, for example on the upper side in FIG. 3, the first contact housing 35 has at least one collar portion 200, the collar portion 200 being realized circumferentially around the axis 125. In an embodiment, there is respectively one collar portion 200 realized for each contact receiver 190, 195. The collar portion 200 delimits a sensor receiver 205 with an inner circumferential side 206 of the collar portion 200. The temperature measuring device 50, 70 is thereby prevented from tilting in the sensor receiver 205. The sensor receiver 205 leads, in the axial direction with respect to the axis 125, to the inside of the associated contact receiver 190, 195, in FIG. 3 the first contact receiver 190.

In addition, the first high-current contact device 25 may have a sensor cover 210 shown in FIG. 3. In the embodiment, for each collar portion 200, there is respectively one sensor cover 210 arranged on the collar portion 200.

A fourth sub-section 215 of the temperature measuring device 50, 70 engages in the sensor receiver 205, as shown in FIG. 3. A fifth sub-section 220 of the temperature measuring device 50, 70 projects into the respective contact receiver 190, 195. The sensor casing 90 bears with the sealing contour 135, in particular the sealing lip 140, against the inner circumferential side 206, such that the sensor receiver 205 is sealed off from an environment of the system 10, and ingress of liquid via the sensor receiver 205 laterally past the sensor casing 90 is prevented. Corrosion of the contact element 45, 65, 75, 80 is thereby prevented. Instead of the sealing contour 140, a sealing element may also be arranged between the sensor casing 90 and the inner circumferential side 206.

On a side facing away from the first contact element 45, the sensor cover 210 is attached to the collar portion 200, as shown in FIG. 3. The sensor cover 210 closes the sensor receiver 205 on a side facing away from the contact receiver 190, 195 (in the z-direction). The sensor cover 210 bears with an inner side 225 against the pressing surface 145 of the sensor casing 90. In an embodiment, the sensor cover 210 has at least one web 230 on the inside. In an embodiment, a plurality of webs 230 are arranged, offset from each other in the x-direction, on the sensor cover 210. Each of the webs 230 is plate-shaped and extends, exemplarily, in a yz-plane. A free end of each of the webs 205 forms the inner side 225 of the cover. The sensor cover 210 also has a circumferential rim 231. The rim 231 may, for example, be positively connected to the collar portion 200 by a latching device.

In the assembled state, the free end of the web 230 bears with the inner side 225 of the cover against the pressing surface 145. The sensor cover 210 is also latched to the collar portion 200. The sensor cover 210 thereby provides a pressing force $F_P$ acting along the axis 125. With the pressing force $F_P$, the sensor cover 210 acts against the pressing surface 145 and presses the sensor casing 90 against the second outer circumferential side 130 of the associated contact element 45, 65, 75, 80. In FIG. 3, the sensor casing 90 of the first temperature measuring device 50 is pressed against the second outer circumferential side 130 of the first contact element 45. The sensor casing 90 is arranged in a tensioned manner in the sensor receiver 205 and a bearing contact surface 120 of the temperature measuring device 50, 70 presses with a pressing force $F_P$ against the outer circumferential side 115, 130 of the contact element 45, 65.

In FIG. 3, the first contact element 45 provides a counterforce $F_G$ acting against the pressing force $F_P$. As a result of the pressing, the bearing contact surface 120 bears flatly against the second outer circumferential side 130, such that a thermal transfer resistance between the first contact element 45 and the sensor casing 90 is particularly low.

In an embodiment, the pressing force $F_P$ and the corresponding counterforce $F_G$ are selected in such a way that the sensor casing 90 is reversibly elastically deformed between 10 percent and 40 percent, at least in the vertical direction between the temperature sensor 85 and the bearing contact surface 120. In this way, the thermal transfer resistance between the bearing contact surface 120 and the sensor casing 90 can be further reduced. The pressing force $F_P$ can be introduced particularly effectively into the pressing surface 145 through the multiple webs 230 in the sensor casing 90.

In addition, the sensor cover 210 may have a lead-through 235 that leads into the sensor receiver 205, as shown in FIG. 3. The connection cable 95 is led out of the sensor receiver 205 through the lead-through 235. In addition, the connection cable 95 is led between two adjacent webs 230, such that pinching of the connection cable 95 is prevented. Jamming of the connection cable 95 is prevented when it is led out of the contact housing 35, 40. Moreover, the sensor cover 210 can reliably introduce the pressing force $F_P$ into the sensor casing 90 without thereby damaging the connection cable 95.

FIG. 4 shows a sectional view, along a sectional plane A-A shown in FIG. 1, through the system 10 shown in FIG. 1, in the assembled state. In this case, for reasons of clarity, in FIG. 4 the second high-current contact device 30 is only indicated schematically by a dashed line.

In the assembled state shown in FIG. 4, the first contact element 45 contacts the third contact element 75, and the second contact element 65 contacts the fourth contact element 80. In the case of the contact between the first contact element 45 and the third contact element 75, in the plug-in region 100, the system 10 has a first electrical ohmic contact resistance. Likewise, the connection device 15 has a second electrical ohmic contact resistance at the electrical contact between the electrical conductor 175 of the high-current cable 20 and the connection receiver 185 of the first electrical contact element 45. During transmission of the electric current, in particular a current greater than 100 amperes, the contact element 45, 65, 75, 80 heats up due to the first and second ohmic contact resistance, as well as an internal ohmic resistance of the contact element 45, 65, 75, 80.

Due to the short distance between the temperature sensor 85 of the temperature measuring device 50, 70 and the associated first or second contact element 45, 65, and the good thermal connection of the temperature sensor 85, via the sensor casing 90, to the connection portion 105, the temperature sensor 85 of the first temperature measuring device 50 can measure the first temperature $T_{S1}(t)$ of the connection region 105 of the first contact element 45 in a particularly precise manner. Likewise, the temperature sensor 85 of the second temperature measuring device 70 measures the second temperature $T_{S2}(t)$ of the connection portion of the second contact element 65.

If a third temperature $T_{K3}(t)$ of the plug-in region 100 of the first contact element 45 and the first temperature $T_{S1}(t)$, measured by the temperature sensor 85 at the connection region 105 of the first contact element 45, are measured over a time t, it can be seen in the embodiment shown in FIGS. 1 to 4 that the first temperature $T_{S1}(t)$ corresponds to the third temperature $T_{K3}(t)$ with only a few degrees Kelvin difference (less than 6 Kelvin, in particular less than 4 Kelvin), and has a time curve substantially identical to that of the third temperature $T_{K3}(t)$. Due to the direct thermal coupling, the first measured temperature $T_{S1}(t)$ substantially corresponds to the third temperature $T_{K3}(t)$ of the plug-in region 100. The temperature difference between the first temperature $T_{S1}(t)$ and the third temperature $T_{K3}(t)$ can be taken into account by the evaluation device.

The first and the second temperature $T_{S1}(t)$, $T_{S2}(t)$ measured by the temperature sensor 85 thus represent a precise indirect temperature measurement of the first contact element 45 and of the second contact element 65, respectively, in the plug-in region 100. The respective temperature sensor 85 provides the information of the measured first and second temperature $T_{S1}(t)$, $T_{S2}(t)$, respectively, to the evaluation device via the connection cable 95. The evaluation device can take the measured first temperature $T_{S1}(t)$ and the second temperature $T_{S2}(t)$ into account for controlling, for example, the drive motor of the motor vehicle. Overheating of the contact element 45, 65 can thus be detected at an early stage, and if necessary current transmitted via the high-current contact device 25, 30 can be reduced accordingly. To keep the first and second contact resistance low, the first and second sealing device 55, 60 seal off the contact elements 45, 65, 75, 80 from the environment.

The embodiment of the system 10 shown in FIGS. 1 to 4 is particularly well suited for the particularly precise and accurate measurement of dynamically changing current loads that are to be transmitted, by the system 10, between the high-current cable 20 and the third and fourth contact elements 75, 80, in particular to the electrical energy storage device.

The connection cable 95 allows the temperature sensor 85 to be flexibly connected to the evaluation device. Owing to the temperature measuring device 50, 70 being inserted on one side, the connection cable 95 can be led independently of the course of the high-current cable 20.

Due to the temperature sensor 85 being encapsulated by the sensor casing 90, and to the materially bonded connection of the sensor casing 90 both to the temperature sensor 85 and to the first cable sheathing 150, the temperature sensor 85 is protected against the ingress of moisture. Leakage current is thereby prevented, such that the temperature sensor 85 measures the first or second temperature $T_{S1}(t)$, $T_{S2}(t)$ in a particularly precise manner.

Due to the temperature measuring device 50, 70 being integrated into the contact housing 35, 40 and the sensor receiver 205 being inclined with respect to the plug-in axis 110, the temperature measuring device 50, 70 can be mounted in a particularly simple and cost-effective manner. If necessary, the temperature measuring device 50, 70 can also be replaced in the event of damage without demounting the high-current contact device 25, 30.

The design described in FIGS. 1 to 4 is also suitable in particular for high-current contact device 25, 30 that are contacted to each other and mechanically locked, for example by a lever device 240.

What is claimed is:
1. A high-current contact device, comprising:
   a contact element insertable along a plug-in axis at least partially into a further contact element of a further high-current contact device;
   a contact housing having a contact receiver receiving the contact element and a sensor receiver inclined with respect to the plug-in axis, the sensor receiver delimited by a collar portion and leads into the contact receiver; and a temperature measuring device including:
a sensor casing, an integral, protruding circumferential sealing lip of a sensor casing of the temperature measuring device bears against an inner circumferential side of the collar portion and seals the contact receiver;
a temperature sensor embedded in the sensor casing; and
a connection cable with a first cable sheathing and an electrically insulated and electrically conductive sensor line through the first cable sheathing, the sensor casing is connected to the first cable sheathing in a materially bonded manner, the temperature measuring device arranged at least partially in the sensor receiver, the temperature measuring device bears against an outer circumferential side of the contact element and measures a first temperature of the contact element.

2. The high-current contact device of claim 1, wherein the sensor casing bears against the contact element and thermally couples the temperature sensor to the contact element, the temperature sensor measures a second temperature of the contact element.

3. The high-current contact device of claim 1, wherein the connection cable is led to the temperature sensor and the sensor line is electrically connected to the temperature sensor, the connection cable embedded in a sub-portion in the sensor casing is led to the temperature sensor.

4. The high-current contact device of claim 1, wherein the sensor casing and the first cable sheathing include a substantially identical matrix material.

5. The high-current contact device of claim 1, wherein the sensor casing and the first cable sheathing include a matrix material selected from at least one of silicone, polyethylene, and polyurethane, and a filler embedded in the matrix material selected from at least one of copper, aluminum, and silver.

6. The high-current contact device of claim 1, wherein the sensor casing has a thermal conductivity greater than or equal to 1 W/(m·K) and less than or equal to 2 W/(m·K).

7. The high-current contact device of claim 1, wherein the contact element has a plug-in region and a connection region connected to the plug-in region, the connection region has a connection receiver on an inside for receiving and electrically contacting an electrical conductor of a high-current cable, the plug-in region forms an electrical contact with the further contact element.

8. The high-current contact device of claim 7, wherein the temperature measuring device bears against an outer circumferential side of the connection region.

9. The high-current contact device of claim 1, further comprising a sensor cover arranged on an outside of the contact housing, the sensor cover at least partially closes an outside of the sensor receiver.

10. The high-current contact device of claim 9, wherein an inner side of the sensor cover bears against the temperature measuring device on a side that faces opposite and away from the contact element and ensures physical contact between the temperature measuring device and the contact element.

11. The high-current contact device of claim 10, wherein the sensor casing is arranged in a tensioned manner in the sensor receiver and a bearing contact surface of the temperature measuring device presses with a pressing force against the outer circumferential side of the contact element.

12. The high-current contact device of claim 9, wherein the sensor cover has a lead-through leading into the sensor receiver, the connection cable is led out of the sensor receiver through the lead-through.

13. The high-current contact device of claim 9, wherein the sensor cover has a circumferential rim arranged on an outside of a collar portion of the contact housing and positively connected to the collar portion.

14. A connection device for transmitting electrical energy, comprising:
a high-current contact device including a contact element insertable along a plug-in axis at least partially into a further contact element of a further high-current contact device, a contact housing having a contact receiver receiving the contact element, and a temperature measuring device, the contact housing has a sensor receiver inclined with respect to the plug-in axis, the sensor receiver delimited by a collar portion, an integral circumferential sealing lip of the sensor casing bears against an inner circumferential side of the collar portion and seals the contact receiver, the sensor receiver leads into the contact receiver, the temperature measuring device is received at least partially in the sensor receiver in an insertion direction perpendicular to the plug-in axis, a surface of the temperature measuring device facing in the insertion direction bears against an opposing outer circumferential side of the contact element, the temperature measuring device measures a temperature of the contact element; and
a high-current cable including an electrical conductor and cable sheathing encasing the electrical conductor, the electrical conductor is electrically connected to the contact element.

15. The connection device of claim 14, wherein the contact element has a plug-in region and a connection region connected to the plug-in region, the connection region has a connection receiver on an inside receiving and electrically contacting the electrical conductor of the high-current cable, the temperature measuring device bears against an outer circumferential side of the connection region directly opposite the electrical conductor.

16. A high-current contact device, comprising:
a contact element insertable along a plug-in axis at least partially into a further contact element of a further high-current contact device, the contact element defining a plug-in region and a connection region connected to the plug-in region, the connection region having a connection receiver on an inside for receiving and electrically contacting an electrical conductor of a high-current cable;
a contact housing having a contact receiver receiving the contact element and a sensor receiver delimited by a collar portion and inclined with respect to the plug-in axis, the sensor receiver leads into the contact receiver; and
a temperature measuring device arranged at least partially in the sensor receiver, the temperature measuring device bears against an outer circumferential side of the connection region of the contact element directly opposite the electrical conductor and measures a first temperature of the contact element, an integral circumferential sealing lip of a sensor casing of the temperature measuring device bears against an inner circumferential side of the collar portion and seals the contact receiver.

17. The high-current contact device of claim 16, wherein the temperature measuring device is received at least partially in the sensor receiver in an insertion direction perpendicular to the plug-in axis, a surface of the temperature measuring device facing in the insertion direction bears against an opposing outer circumferential side of the contact element.

\* \* \* \* \*